US012613865B2

(12) United States Patent
Ma et al.

(10) Patent No.: US 12,613,865 B2
(45) Date of Patent: Apr. 28, 2026

(54) DATABASE QUERY OPTIMIZATION

(71) Applicant: INTERNATIONAL BUSINESS MACHINES CORPORATION, Armonk, NY (US)

(72) Inventors: Xiao Ming Ma, Xi'an (CN); Xue Ying Zhang, Xi'an (CN); Sheng Yan Sun, Beijing (CN); Peng Hui Jiang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 104 days.

(21) Appl. No.: 18/429,546

(22) Filed: Feb. 1, 2024

(65) Prior Publication Data

US 2025/0252102 A1      Aug. 7, 2025

(51) Int. Cl.
G06F 16/24       (2019.01)
G06F 16/2453       (2019.01)
(52) U.S. Cl.
CPC .............................. G06F 16/24542 (2019.01)
(58) Field of Classification Search
None
See application file for complete search history.

(56) References Cited

U.S. PATENT DOCUMENTS

| | | | |
|---|---|---|---|
| 5,864,842 A | 1/1999 | Pederson et al. | |
| 6,539,391 B1 * | 3/2003 | DuMouchel ............ | G06F 16/30 707/999.102 |
| 7,376,638 B2 | 5/2008 | Gordon | |

| | | | |
|---|---|---|---|
| 7,805,411 B2 | 9/2010 | Ziauddin et al. | |
| 8,126,870 B2 | 2/2012 | Chowdhuri et al. | |
| 2006/0149724 A1 | 7/2006 | Ritter et al. | |
| 2009/0100004 A1 | 4/2009 | Andrei et al. | |
| 2017/0277750 A1 * | 9/2017 | Fan .................... | G06F 16/24565 |

(Continued)

FOREIGN PATENT DOCUMENTS

| | | | | | |
|---|---|---|---|---|---|
| CN | 109074373 A | * | 12/2018 | ....... | G06F 16/24542 |
| CN | 111538728 A | * | 8/2020 | ....... | G06F 16/24535 |

(Continued)

OTHER PUBLICATIONS

Querying Big Data by Accessing Small Data, Fan et al (Year: 2015).*

(Continued)

*Primary Examiner* — Augustine K. Obisesan
(74) *Attorney, Agent, or Firm* — Lily Neff, Esq.; Rachel L. Pearlman, Esq.; Heslin Rothenberg Farley & Mesiti P.C.

(57) ABSTRACT

Computer implemented methods, systems, and computer program products include program code executing on a processor(s) identifies a query with low performance. The program code generates a small data environment for use in optimizing the query. The program code identifies table(s) and field(s) related to the query with low performance. The program code samples a portion of each table of the one or more tables based on, for each table, parameters of the one or more fields in each table, where the portion sampled comprises records from each table with common data traits to a whole of each table. The program code generates a small data environment comprising the portion of each table. The program code performance tests an optimized version of the query by executing it on the small data environment.

20 Claims, 6 Drawing Sheets

<u>200</u>

```
┌─────────────────────────────┐
│ PROGRAM CODE EXECUTED BY THE ONE OR │
│ MORE PROCESSORS IDENTIFIES QUERIES (e.g., │──210
│ SQL STATEMENTS) WITH LOW PERFORMANCE │
└─────────────────────────────┘
              │
              ▼
┌─────────────────────────────┐
│ PROGRAM CODE IDENTIFIES TABLES │
│ AND FIELDS RELATED TO THE QUERY │──220
│ (e.g., REFERENCED IN THE QUERY) │
└─────────────────────────────┘
              │
              ▼
┌─────────────────────────────┐
│ PROGRAM CODE SAMPLES RECORDS FROM THE │
│ RELATED (IDENTIFIED) TABLES AND GENERATES, │
│ FOR EACH TABLE, A SMALLER TABLE WITH THE │──230
│ SAME TRAITS AS THE SAMPLED (ORIGINAL) TABLE │
└─────────────────────────────┘
              │
              ▼
┌─────────────────────────────┐
│ PROGRAM CODE OPTIMIZES THE LOW │
│ PERFORMANCE QUERY AND TESTS THE │──240
│ OPTIMIZATION AGAINST THE SMALLER TABLE(S) │
└─────────────────────────────┘
              │
              ▼
┌─────────────────────────────┐
│ PROGRAM CODE EXECUTES THE OPTIMIZED QUERY │
│ AGAINST THE ORIGINAL TABLES ONCE IT HAS │
│ REACHED A DESIRED PERFORMANCE THRESHOLD │──250
│ WHEN EXECUTED AGAINST THE SMALLER TABLE(S) │
└─────────────────────────────┘
```

(56)          References Cited

U.S. PATENT DOCUMENTS

| | | | |
|---|---|---|---|
| 2018/0107714 | A1 | 4/2018 | Tariq et al. |
| 2022/0222229 | A1* | 7/2022 | Del Pino Ruiz .... G06F 16/2455 |

FOREIGN PATENT DOCUMENTS

| | | | | | |
|---|---|---|---|---|---|
| CN | 109491989 | B | * | 8/2021 | |
| CN | 113868141 | A | * | 12/2021 | .......... G06F 11/3688 |
| CN | 114169004 | A | * | 3/2022 | ......... G06F 21/6227 |
| CN | 116244345 | A | * | 6/2023 | ......... G06F 16/2457 |

OTHER PUBLICATIONS

Schlaipfer, Matthias et al., "Optimizing Big-Data Queries Using Program Synthesis," Oct. 28, 2017. pp. 631-646.
Muniswamaiah, Manoj et al., "Query Performance Optimization In Databases for Big Data," CS and IT-CSCP, 2019 (no further date information available), pp. 85-90.

\* cited by examiner

100

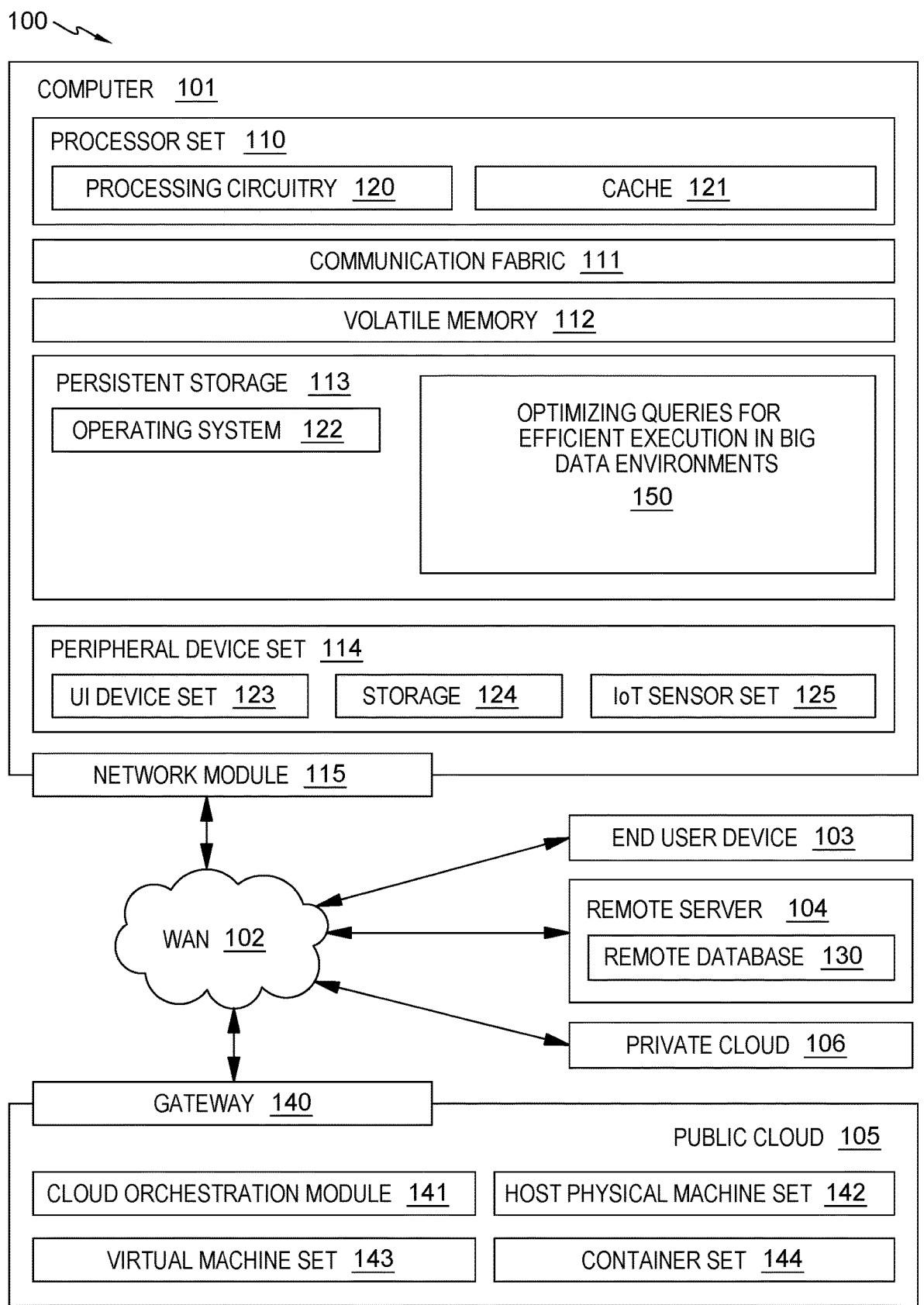

COMPUTER  101

PROCESSOR SET  110

PROCESSING CIRCUITRY  120          CACHE  121

COMMUNICATION FABRIC  111

VOLATILE MEMORY  112

PERSISTENT STORAGE  113

OPERATING SYSTEM  122

OPTIMIZING QUERIES FOR EFFICIENT EXECUTION IN BIG DATA ENVIRONMENTS  150

PERIPHERAL DEVICE SET  114

UI DEVICE SET  123          STORAGE  124          IoT SENSOR SET  125

NETWORK MODULE  115

WAN  102

END USER DEVICE  103

REMOTE SERVER  104

REMOTE DATABASE  130

PRIVATE CLOUD  106

GATEWAY  140

PUBLIC CLOUD  105

CLOUD ORCHESTRATION MODULE  141          HOST PHYSICAL MACHINE SET  142

VIRTUAL MACHINE SET  143          CONTAINER SET  144

FIG. 1

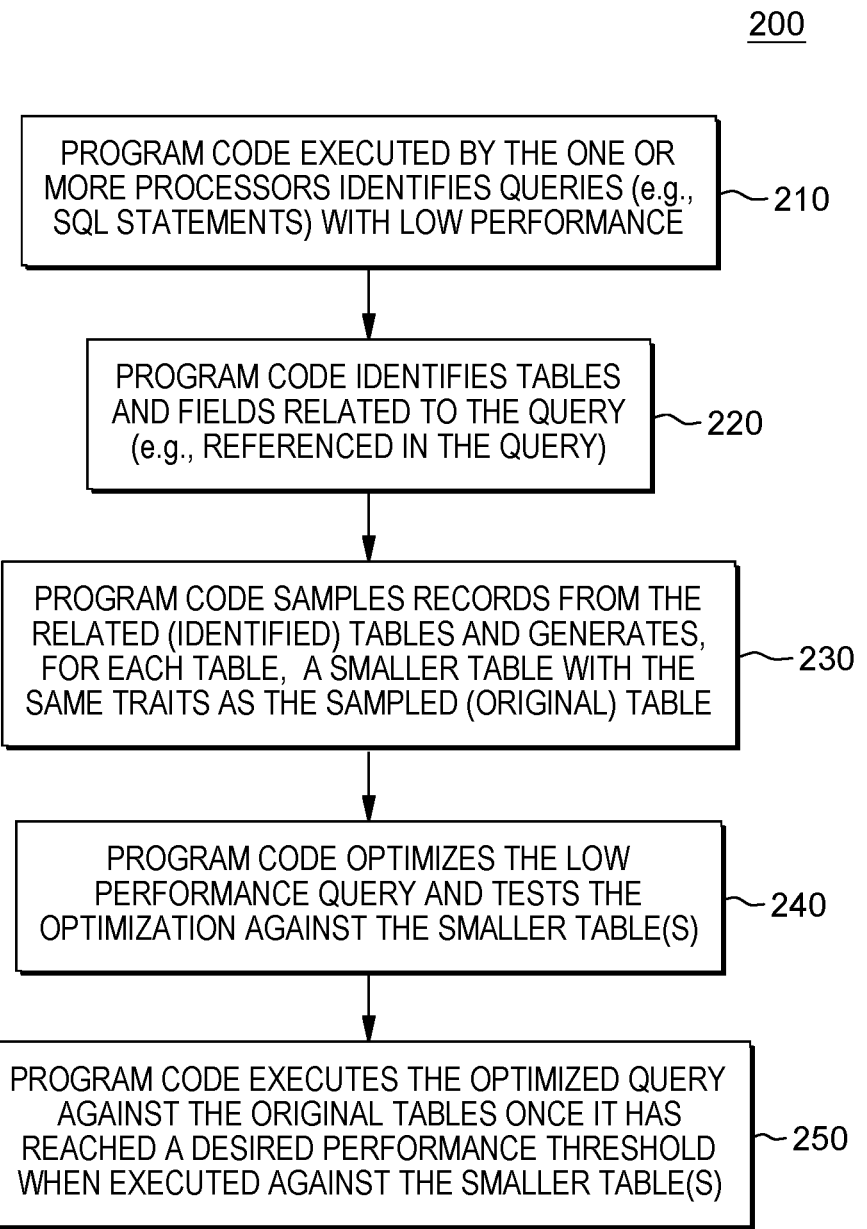

200

PROGRAM CODE EXECUTED BY THE ONE OR MORE PROCESSORS IDENTIFIES QUERIES (e.g., SQL STATEMENTS) WITH LOW PERFORMANCE — 210

PROGRAM CODE IDENTIFIES TABLES AND FIELDS RELATED TO THE QUERY (e.g., REFERENCED IN THE QUERY) — 220

PROGRAM CODE SAMPLES RECORDS FROM THE RELATED (IDENTIFIED) TABLES AND GENERATES, FOR EACH TABLE, A SMALLER TABLE WITH THE SAME TRAITS AS THE SAMPLED (ORIGINAL) TABLE — 230

PROGRAM CODE OPTIMIZES THE LOW PERFORMANCE QUERY AND TESTS THE OPTIMIZATION AGAINST THE SMALLER TABLE(S) — 240

PROGRAM CODE EXECUTES THE OPTIMIZED QUERY AGAINST THE ORIGINAL TABLES ONCE IT HAS REACHED A DESIRED PERFORMANCE THRESHOLD WHEN EXECUTED AGAINST THE SMALLER TABLE(S) — 250

FIG. 2

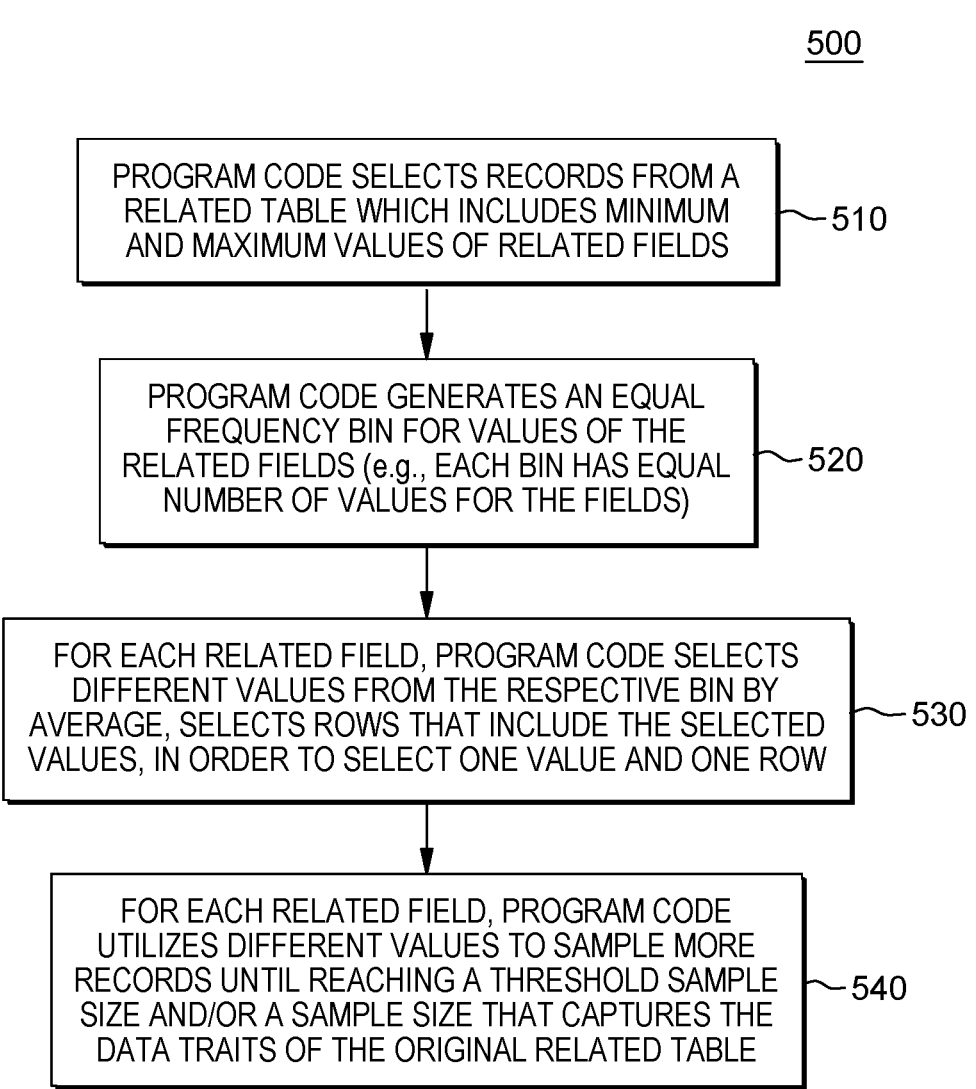

500

PROGRAM CODE SELECTS RECORDS FROM A RELATED TABLE WHICH INCLUDES MINIMUM AND MAXIMUM VALUES OF RELATED FIELDS ∼510

PROGRAM CODE GENERATES AN EQUAL FREQUENCY BIN FOR VALUES OF THE RELATED FIELDS (e.g., EACH BIN HAS EQUAL NUMBER OF VALUES FOR THE FIELDS) ∼520

FOR EACH RELATED FIELD, PROGRAM CODE SELECTS DIFFERENT VALUES FROM THE RESPECTIVE BIN BY AVERAGE, SELECTS ROWS THAT INCLUDE THE SELECTED VALUES, IN ORDER TO SELECT ONE VALUE AND ONE ROW ∼530

FOR EACH RELATED FIELD, PROGRAM CODE UTILIZES DIFFERENT VALUES TO SAMPLE MORE RECORDS UNTIL REACHING A THRESHOLD SAMPLE SIZE AND/OR A SAMPLE SIZE THAT CAPTURES THE DATA TRAITS OF THE ORIGINAL RELATED TABLE ∼540

DATABASE QUERY OPTIMIZATION

BACKGROUND

The present invention relates generally to the field of query optimization in databases and, specifically, to improving query performance when querying big data.

Big data refers to extremely large and diverse collections of structured, unstructured, and semi-structured data that continue to grow exponentially over time. Big data refers to datasets that are so huge and complex in volume, velocity, and variety, that traditional data management systems cannot store, process, and analyze them. Volume, velocity and variety are referred to as the "Three Vs" of big data. Two additional Vs, variability and value, have been proposed for use as a descriptor for these sets as well. Variability refers to an increase in the range of values typical of a large data set while value addresses the need for valuation of enterprise data.

Various industries rely on an efficient use of big data, as represented by the Three Vs, are healthcare and cybersecurity. In healthcare, many medical devices are part of the Internet of Things (IoT), and IoT devices collect and transmit large amounts of data about patients from a variety of sources, contributing to the big data volume and variety of these data. Healthcare data originates from a variety of sources, including but not limited to, genomics data sets, electronic health records, patient data from wearables and biosensors, and third-party data from insurance claims, published literature, and social media. The healthcare industry can be time sensitive and hence, the velocity of processing is important for applications including but not limited to anticipating drug interactions and moving potential treatments though regulatory processes. Effective cybersecurity management includes obtaining threat information as close to real time as possible. Like healthcare data, cybersecurity data includes a large volume of data from a variety of sources, which in cybersecurity can include Information Technology (IT) networks and systems, security applications, other applications, physical surveillance systems, and virtual surveillance systems. Processing velocity is relied upon so systems administrators and data scientists can monitor the changing cybersecurity landscape and address vulnerabilities quickly.

Artificial intelligence (AI) refers to intelligence exhibited by machines. Artificial intelligence (AI) research includes search and mathematical optimization, neural networks, and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided through the provision of a computer-implemented method for improving performance of queries with historically low performance in a big data environment. The method can include: identifying, by one or more processors, a query with low performance; generating, by the one or more processors, a small data environment from the big data environment, the small data environment for use in optimizing the query with low performance, the generating comprising: identifying, by the one or more processors, one or more tables and one or more fields in each table of the one or more tables, the one or more tables and the one or more fields related to the query with low performance; sampling, by the one or more processors, a portion of each table of the one or more tables based on, for each table, parameters of the one or more fields in each table, wherein the potion sampled comprises records from each table with common data traits to a whole of each table; and generating, by the one or more processors, the small data environment, the small data environment comprising the portion of each table; and performance testing, by the one or more processors, an optimized version of the query with low performance, by executing the optimized version on the small data environment.

Shortcomings of the prior art are overcome, and additional advantages are provided through the provision of a computer program product for improving performance of queries with historically low performance in a big data environment. The computer program product comprises a storage medium readable by a one or more processors and storing instructions for execution by the one or more processors for performing a method. The method includes, for instance: identifying, by the one or more processors, a query with low performance; generating, by the one or more processors, a small data environment from the big data environment, the small data environment for use in optimizing the query with low performance, the generating comprising: identifying, by the one or more processors, one or more tables and one or more fields in each table of the one or more tables, the one or more tables and the one or more fields related to the query with low performance; sampling, by the one or more processors, a portion of each table of the one or more tables based on, for each table, parameters of the one or more fields in each table, wherein the potion sampled comprises records from each table with common data traits to a whole of each table; and generating, by the one or more processors, the small data environment, the small data environment comprising the sampled portion of each table; and performance testing, by the one or more processors, an optimized version of the query with low performance, by executing the optimized version on the small data environment.

Shortcomings of the prior art are overcome, and additional advantages are provided through the provision of a system for improving performance of queries with historically low performance in a big data environment. The system includes: a memory, one or more processors in communication with the memory, and program instructions executable by the one or more processors via the memory to perform a method. The method includes, identifying, by the one or more processors, a query with low performance; generating, by the one or more processors, a small data environment from the big data environment, the small data environment for use in optimizing the query with low performance, the generating comprising: identifying, by the one or more processors, one or more tables and one or more fields in each table of the one or more tables, the one or more tables and the one or more fields related to the query with low performance; sampling, by the one or more processors, a portion of each table of the one or more tables based on, for each table, parameters of the one or more fields in each table, wherein the potion sampled comprises records from each table with common data traits to a whole of each table; and generating, by the one or more processors, the small data environment comprising the sampled portion of each table; and performance testing, by the one or more processors, an optimized version of the query with low performance, by executing the optimized version on the small data environment.

Computer systems and computer program products relating to one or more aspects are also described and may be claimed herein. Further, services relating to one or more aspects are also described and may be claimed herein.

Additional aspects of the present disclosure are directed to systems and computer program products configured to perform the methods described above. Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 1 depicts one example of a computing environment to perform, include and/or use one or more aspects of the present disclosure;

FIG. 2 is a workflow of various aspects performed by the program code (executing on one or more processors) in some embodiments of the present disclosure;

FIG. 5 is a workflow of various aspects performed by the program code (executing on one or more processors) in some embodiments of the present disclosure.

DETAILED DESCRIPTION

Figure 3:
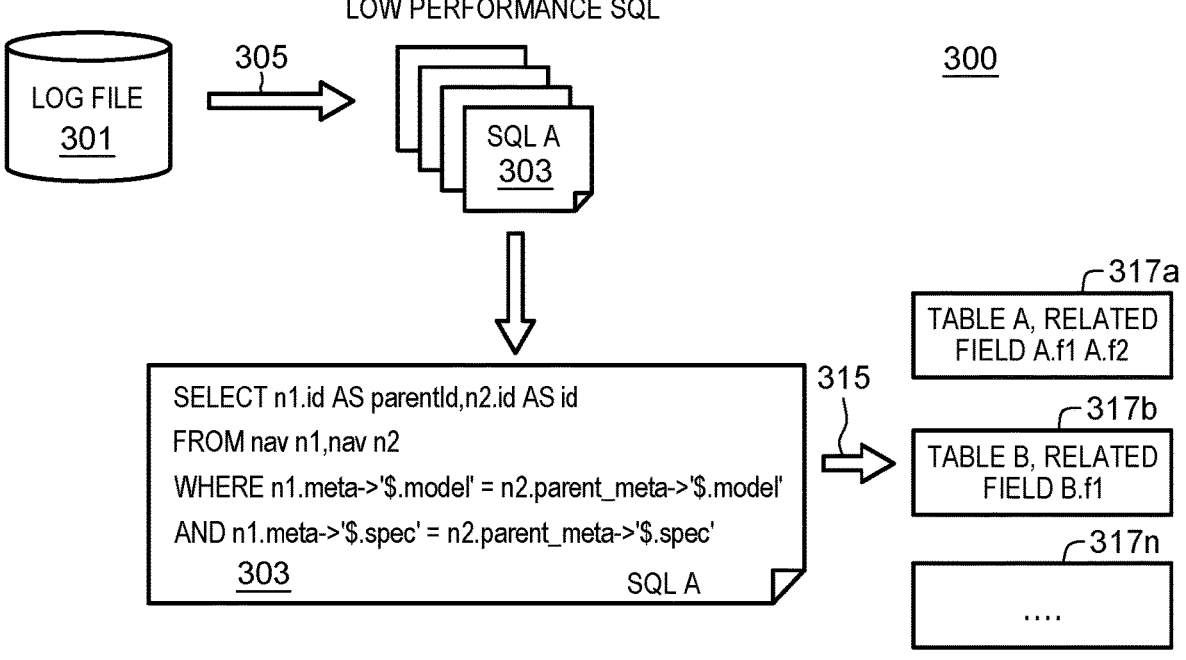
FIG. 3 illustrates a workflow executed in a technical environment and illustrates aspects of both the workflow itself and hardware and/or software comprising the technical environment; the workflow and technical environmental elements illustrate various aspects performed by the program code performed by the program code in some embodiments of the present disclosure.

The examples herein include computer-implemented methods, computer program products, and computer systems where program code executing on one or more processors improves query efficiency by identifying low performance queries and optimizing these queries (e.g., structurally) to improve performance.

Structured Query Language (SQL) statements are executed in databases to obtain, modify, add, and delete data. SQL statements or queries can become complex as general databases and their applications evolve. Factors that increase the complexity of SQL queries utilized in database system include, but are not limited to, continuous expansion of businesses, database structure adjustments, and/or data volume expansion and data distribution changes. These changes can lead to query performance degradation meaning that more time is needed to execute a SQL statement. Because of the characteristics of big data, query degradation is a common issue. Query degradation issues can impact overall system performance as when executing a complex query and/or executing a query in a large data, even a small deviation in database statistics can be amplified (e.g., by multiple level and join type) and adversely impact performance to a degree that can frustrate the useability of a whole of a computer system.

The examples herein provide significant advantages over existing query optimization approaches at least because the examples described herein are faster and more efficient than these existing approaches. Existing approaches include granular steps where each step uses resources, especially time, to complete. Many approaches include each of the following steps: 1) identifying the low performance SQL; 2) running one SQL statement; 3) analyzing the executed SQL to optimize it to decrease execution cost (e.g., processing cost); 4) checking the optimized result (which can be especially time-consuming with a big data); and 5) reorganizing and renewing statistics based on the optimized statement (provided that the check was successful). In contrast, the examples provide an automatic framework to identify low performance queries (e.g., SQL) and to optimize these queries to improve their performance.

Instead of utilizing the existing granular approach described above, which is particularly time consuming when handling big data, in the examples herein, program code executing on one or more processors, generates a "small data" version of the database environment relevant to queries executed therein and utilizes this small data environment to test optimized queries. As described in greater detail herein, in some examples, to generate the small data environment (part of the aforementioned framework), program code executing on one or more processors (in some examples herein): 1) recognizes a low performance query; 2) automatically identifies tables and fields relevant to the query; 3) samples the identified tables and fields and generates a new tables from each original table (e.g., the original tables have more records) while retaining similar data traits in the new table based on sampling one or more records in the original table with these traits. In some examples, the program code automatically applies one or more optimization method (which will be discussed in greater detail herein) on the low performing query and selects an optimized version of the query (for use moving forward) that returns the same result as the original query on both the original table and the small table. Various advantages provided by the examples herein include but are limited to: 1) identifying poor query performance; 2) utilizing smaller tables to provide more efficient query optimization (applicable in big data environments); and 3) providing a framework with which to optimize queries automatically.

Embodiments of the present invention are inextricably tied to computing. The examples herein provide a computer-based solution to an issue in computing. Many applications and products rely on executing queries in databases. How these queries pull data from various databases within computing systems, such as distributed systems, can be managed by middleware, including database management software. As computing systems grow and enterprise, hybrid, and cloud or other distributed computing environments become more prevalent, inefficient queries can stress the system as a whole and can compromise the performance of the system. The examples described herein provide methods, systems, and computer program products that include program code executing on one or more processors that creates a framework for optimizing queries, especially those queries which are executed in big data environments.

The examples herein are directed to a practical application and provide significantly more than existing approaches to query optimization in big data environments. The examples discussed herein are directed to the practical application of increasing query efficiency, in particular, in big data environments, where, as explained above, efficiency is a requirement of many applications (e.g., velocity) and the volume and variety of these data can create a hinderance to the speed. Some existing approaches aim to improve query performance by manipulating the original query, including by splitting the complete query, for example, into query blocks. Other approaches merely identify slower queries by analyzing each execution log time but do not optimize the query in an efficient manner. Some existing approaches are time consuming because they involve identifying low performance queries, running each SQL statement of the low performing query, individually, understanding and optimizing the individual statement to make a best cost choice, and checking the optimized result on the database (which can be a big data environment). These existing approaches lead to reorganizing and/or renewing statistics multiple times, which can be cost and time intensive, especially for large enterprise customers. The examples herein provide significantly more because the framework described herein not only optimizes queries to make them fast and efficient, but it also provides a system by which to optimize the queries which is faster and more efficient. In the examples here, program code executing on one or more processors can identify a low performance query automatically, generate sample records that are smaller (decrease processing time) but also, retain original table data traits so that tuning a query utilizing these sample records effectively tunes the query for execution on the whole volume, and thus, automatically optimizes the query with high performance based on these sampled data.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present disclosure is described with reference to FIG. 1. In one example, a computing environment 100 contains an example of an environment for the execution of at least some of the computer code involved in performing the inventive methods, such as a code block 150 for optimizing queries for efficient execution in big data environments. In addition to block 150, computing environment 100 includes, for example, computer 101, wide area network (WAN) 102, end user device (BUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future, Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110, Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation and/or review to an end user, this recommendation would typically be communicated from network module 115 of computer 101 through WAN 102 to EUD 103. In this way, BUD 103 can display, or otherwise present, the recommendation and/or review to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation and/or review based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

SQL statements comprising queries can be complicated. As businesses expand, so can their databases and their technical architecture requirements. As databases expand and data increases (e.g., in volume and/or variety) and performance demands (e.g., velocity) remains a performance requirement for efficacy, the performance of queries can degrade. With complex queries, a small change to the underlying data (e.g., statistics), can amplify this degraded performance. The examples herein provide continuous optimization of queries to maintain real-time or near real-time performance in various technical environments including in big data environments.

FIG. 2 is a workflow 200 that provides a general overview of a workflow 200 performed by program code executed by one or more processor in some examples herein. In this workflow 200, program code executing on one or more processors acts as an automatic framework to identify low performance queries and to optimize these queries to improve performance of the queries. As illustrated in FIG. 2, program code executed by the one or more processors identifies queries (e.g., SQL statements) with low performance (210). In some examples, the program code identifies the low performance queries by utilizing the National Physical Laboratory (NPL) automatic clocking services. NPL's Internet Time Service (ITS) allows a computer to set its internal clock by connecting over the Internet to a server at NPL that transmits a time code using the Network Time Protocol (NTP). By utilizing this service, the program code can automatically determine which queries are performing below, for example, a pre-determined processing time threshold. Having identified a low performing query (e.g., based on a pre-determined or pre-set threshold for query performance), the program code identifies tables and fields related to the query (e.g., referenced in the query) (220). In some examples, the program code identifies the tables and fields in the query automatically based on keywords. The program code samples records from the related (identified) tables and generates, for each table, a smaller table with the same traits as the sampled (original) table (230). The program code optimizes the low performance query and tests the optimization against the smaller table(s) (240).

When optimizing the query (240), the program code can utilize various query optimization techniques. For example, the program code can split a complicated query into blocks comprising the query by keywords (e.g., SELECT/FROM pairs). The program code can generate a different query from each block based on knowledge map or experience rules that the program code can mine from historical query executions (e.g., utilizing a trained machine learning algorithm). The program code can generate an optimized query based on a knowledge graph. The methods discussed herein for optimizing queries are provided as illustrative and non-limiting examples. Once the program code has generated a version of the low performance query that is optimized, the program code tests the query against the smaller table(s) rather than against the original tables. By testing using the small data environment, the program code saves processing power (e.g., processing cost) and presents a lower risk to adversely affecting system performance during the testing.

Returning to FIG. 2, the in some examples, program code executes the optimized query against the original tables once it has reached a desired performance threshold when executed against the smaller table(s) (250). The program code can test the optimized query for accuracy by comparing the results output when executing the optimized query to those output when executing the original query. If the optimized query us accurate, it should return the same results as the original query when executed against both the small data environment and the big data environment. The program code can compare the results sets from the different versions of the query and the different environments as an accuracy check; the optimized query and the original query should produce common results. Hence, as illustrated in the workflow 200 of FIG. 2, the program code identifies a query with poor performance. The program code generates a small table (e.g., utilizing micro-calculations) so that an optimized version of the query can be tested more efficiently. The program code then optimizes the query based on utilizing the test environment it has generated (the small table(s) and/or small data environment).

FIG. 3 illustrates, in more detail, the aspects of the workflow 200 of FIG. 2 where the program code executed by the one or more processors identifies queries (e.g., SQL statements) with low performance (210) as well as tables and fields related to the query (e.g., referenced in the query) (220). In FIG. 3, which is a workflow with technical environment illustrations 300, The program code determines that a query is a low performance query based on analyzing SQL execution log times in a log file 301 with an NPL (305). In this example, the program code identifies SQL A 303 as a low performance query. SQL A 303 (in its low performance structure) is reproduced below.

SELECT n1.id AS parentId, n2.id AS id
FROM nav n1, nav n2
WHERE
    n1.meta→'$.model'=n2.parent_meta→'$.model'
AND n1.meta→'$.spec'=n2 parent_meta→'$.spec'

The "→" is a JSON command that notes how a value should be returned. The SQL statement (e.g., query), selects the identifier values from tables n1 and n2, from the schema nay and tables n1 and n2 under certain conditions. The conditions are where the field meta in table n1 is equal to the field parent_meta in table n2 (both expressed using the JSON command as $.model) and meta in the n1 table equals parent_meta in the n2 tables (both expressed using the JSON command as $.spec).

Another example of a low performance query is produced below:

SELECT A.f1, B.f1
FROM A, B
WHERE A.f1=A.f2
AND A.f1>B.f1

This example query, which is relevant to FIGS. 3-6, selects field f1 from Table A and field f1 from Table B where f1 in Table A equals 12 in Table A and f1 in Table A is greater than f1 in Table B.

As illustrated in both FIGS. 2 and 3, the program code (e.g., automatically) identifies tables and fields related to the query (220), for example, the program code can extract related table(s) and fields utilizing keywords (315). The program code can order the extracted fields based on how often they are referenced in the query. For example, using the second query provided above as an example if the program code identifies a table "A" and two fields in the table, "f1" and "f2", the program code will prioritize working with the field that is referenced more often, first. If f1 is used more in the query than 12, then the program code rates f1 as a first related field and when sampling from table A (e.g., FIG. 2, 230) the program code will work with f1 before working with f2. In the example in FIG. 3, the program code identifies a first item 317*a*, Table A and field f1 and f2, as being related to SQL A 303 and also a second item 317*b*, Table B and field f1 of Table B, as being related to SQL 303. The program code extracts (315) these various items 317*a*-317*n*. This example of extracted fields does not utilize the same sample query as reproduced below. A sample query that would fit the extraction would be one that references fields f1 and f2 in table called Table A.

Figure 4:
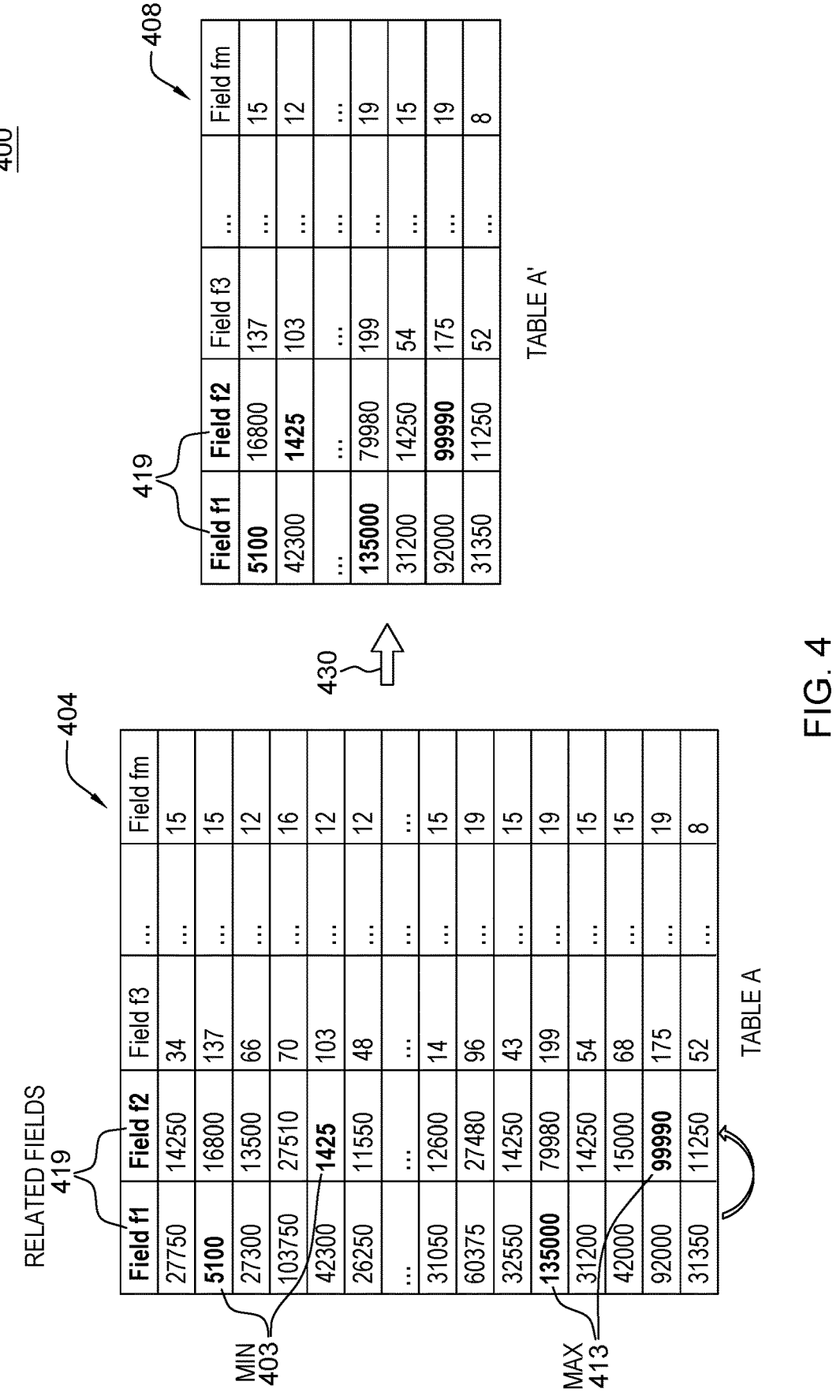
FIG. 4 illustrates the program code (executing on one or more processors) in some embodiments of the present disclosure sampling a portion of a table to generate a smaller table with the same or similar data traits in accordance with various aspects of in some embodiments of the present disclosure.

FIG. 4 illustrates program code executing on one or more processors in some examples herein sampling records from related tables (and fields of those tables) to create a smaller table(s) with similar data traits (e.g., FIG. 2, 230, e.g., FIG. 3, 315, 317*a*-317*n*). The smaller table(s) become a small data environment that the program code can utilize to test potential optimized versions of a query that performs poorly in its original form in the intended (e.g., big data) environment. FIG. 4 includes Table A 404 and Table A' 408. Table A' 408 is a smaller table that includes similar traits to Table A 404. As illustrated in FIG. 3, the field f1 and f2 in Table A are related (e.g., related fields 419) to SQL A 303 (the low performing query). Thus, in the example illustrated in FIG. 4, the program code samples Table A 404 to generate Table A' 408 (430). To sample Table A 404 to generate Table A' 408, the program code selects records that include outliers and/or extreme values. The program code selected the minimum values 403 as well as the maximum values 413 in fields f1 and f2. The program code selects records such that the values in fields f1 and f2 can be selected by average, rather than focusing on one interval. Thus, the smaller table, Table A' 408 has similar data traits to Table A 404. However, queries can be executed (tested) more quickly on the smaller table.

FIG. 5 is a workflow 500 that illustrates an example of how program code in some examples herein selects portions of a referenced table for use in generating a smaller table (e.g., FIG. 4). As aforementioned, in the examples herein, the program code samples records from tables to create a new (smaller) table with a similar data trait. As illustrated in FIG. 5, the program code selects records from a related table which include minimum and maximum values of related fields (510). The program code generates an equal frequency bin for values of the related fields (e.g., each bin has equal number of values for the fields) (520). Equal-frequency binning divides the values into bins that have the same number of observations or frequency. The advantage of this method is that it creates balanced bins that can handle skewed data and outliers (e.g., minimizing the ability of outliers to skew the average values). For each related field (so in the example in FIG. 4, first for f1 and then for f2), the program code selects different values from the respective bin by average, selects rows that include the selected values, to select one value and one row (530). For each related field, the program code utilizes different values to sample more records until reaching a threshold sample size and/or a sample size that captures the data traits of the original related table (540). The program code can verify that the sampled (smaller) table comprises the same data traits based on executing the SQL statement on the smaller tables and obtaining the sample result as on the original table or within a pre-defined tolerance. For the example in FIG. 3, the program code would sample both Table A (for fields f1 and f2) and Table B (for field f1), generating Table A' and Table B'.

Figure 6:
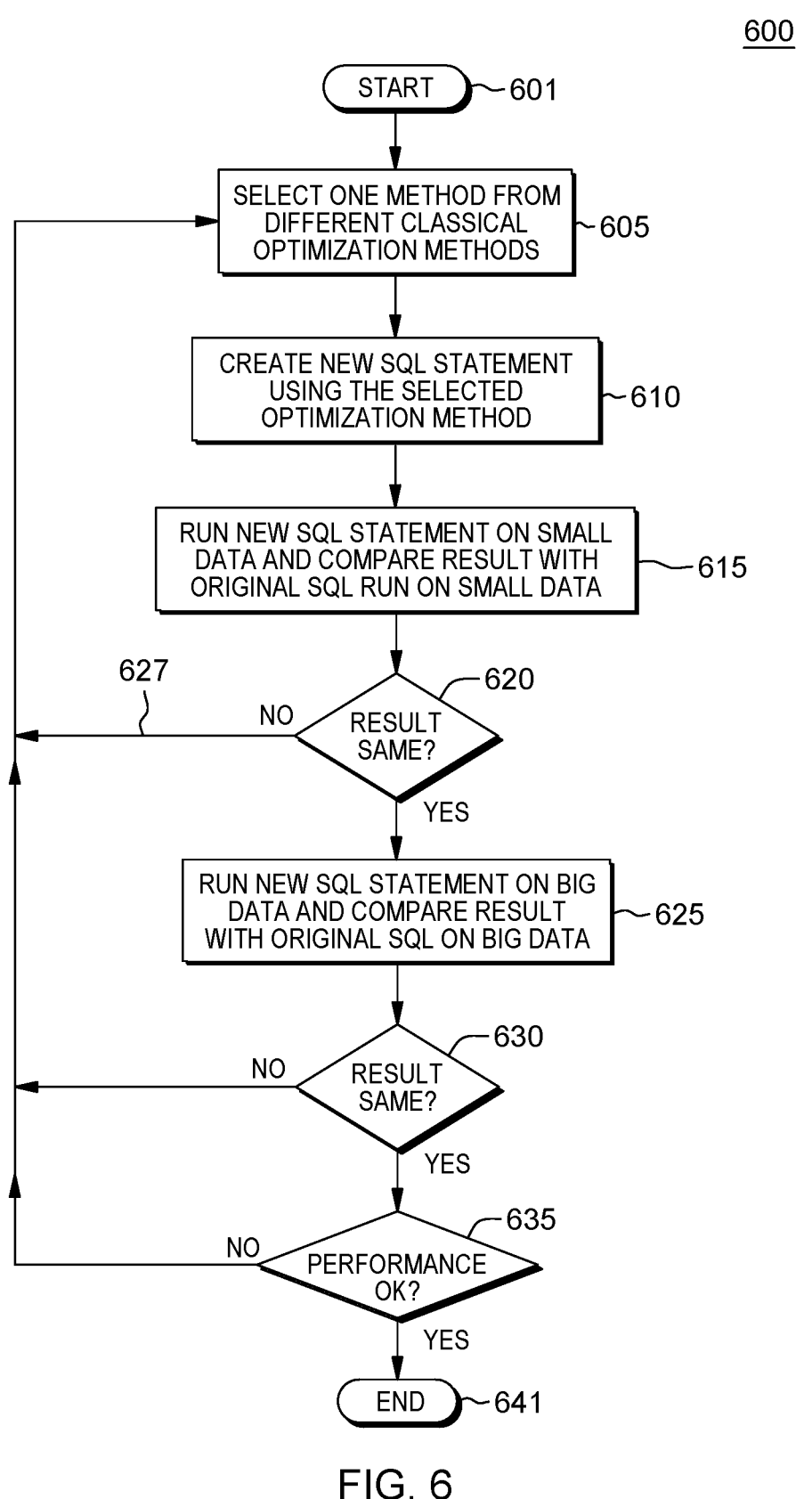
FIG. 6 is a workflow of various aspects performed by the program code (executing on one or more processors) in some embodiments of the present disclosure.

Returning the FIG. 2, the program code optimizes the low performance query and tests the optimization against the smaller tables (240). This aspect of FIG. 2 is further illustrated in FIG. 6, which is a workflow 600 of the program code optimizing the query in some of the examples herein. As illustrated in FIG. 6, the workflow 600 commences (601) and the program code selects one method from different classical optimization methods (605). The program code generates a new SQL statement, from the original low-performing SQL statement (e.g., SQL A 303 in FIG. 3) using the selected optimization method (610). This newly generated statement or query is a potentially optimized version of the original query.

In one non-limiting optimization method, the program code can generate a potential optimized query (for testing before implementation) by splitting the complete original query (SQL statement) into blocks by keywords (e.g., a SELECT/FROM pair). In each block the program code can create a different query based on a knowledge map or experience rules that the program code mines from historical query results. The program code can extract a key sequence (e.g., a sequence that includes the commands SELECT, FROM, WHERE, and qualifiers (e.g., AND one or more time)). The program code can map the sequence to a topic in a knowledge graph. Based on rules, the program code can train a clustering machine learning algorithm or a general analytics statistical method to detect the topics and relationship between topics and a keywords sequence. Thus, the program code can re-write the query according to the mapped topic. Various method of optimizing queries can be utilized in various examples herein.

Returning to FIG. 6, the program code can execute the new SQL statement on the small data environment (e.g., the sampled tables generated by the program code, not the big data environment (i.e., full tables in the database(s))) and compares the results with results obtained when executing the original SQL (the low performance query) on the small data environment (615). The program code determines if the result is the same (620). If the result is not the same, the program code selects another optimization method (605), generates a new SQL query (610), and runs the new statement on the small data environment, comparing it to the result of the original query, run on the small data environment (615, 620). The program code can continue optimizing the query until the results on the small data environment of the optimized query and the original query are the same (i.e., they share a common results set). When the results on the small data are the same, the program code executes the new SQL statement on the big data environment (full table(s), database(s), schemas, etc.) and compares it to the original query executed against the big data environment (625, 630). If the results are not the same (e.g., the results are a common data set), the program code optimizes the query using a different method (605) and cycles through the workflow 600 until such a time as the results on the big data are the same. Once the program code determines that the results are the same, the program code determines if the performance of the optimized query meets a pre-defined threshold or is within pre-defined parameters (e.g., based on customer requirements, system requirements, etc.) (635), If the performance parameters and/or threshold are met, the optimized SQL statement can be utilized moving forward and the workflow 600 is complete (641). If the performance requirements are not met, the program code can optimize the query using another method (605) and cycle through the workflow 600 until the new SQL (optimized query) and the original SQL (original query flagged as low performing) produce the same result against the small data environment (615, 620) and the big data environment (625, 630) and the performance meets the requirements/threshold/parameters (635).

Examples herein include computer-implemented methods, computer program products, and computer systems where program code executing on one or more processors, identifies a query with low performance. The program code generates a small data environment from the big data environment, the small data environment for use in optimizing the query with low performance. To generate the small data environment, the program code identifies one or more tables and one or more fields in each table of the one or more tables, the one or more tables and the one or more fields related to the query with low performance. The program code samples a portion of each table of the one or more tables based on, for each table, parameters of the one or more fields in each table. The potion sampled comprises records from each table with common data traits to a whole of each table. The program code generates the small data environment; the small data environment is comprised of the sampled portion of each table. The program code performance tests an optimized version of the query with low performance by executing the optimized version on the small data environment.

In some examples, the program code sampling the portion of each table of the one or more tables comprises, for each table: the program code selecting rows comprising a minimum value and a maximum value for each of the one or more fields related to the query in the table, the program code generating an equivalency bin for values of the one or more fields related to the query in the table, and the program code selecting one or more additional rows based on iteratively identifying, an average value from the equivalency bin for each value of the values to select a row comprising the average value until the selected one or more additional rows reach a pre-defined sample size. In this example, the rows comprising the minimum value and the maximum value, and the one or more additional rows comprise the records from each table with the common data traits.

In some examples, the program code performance testing on the small data environment further comprises: the program code optimizing the query with low performance to generate the optimized version of the query with low performance. The program code executes the optimized query in the small data environment. Based on the execution reaching a pre-determined performance threshold, the program code executes the optimized query in the big data environment.

In some examples, the program code performance testing on the small data environment further comprising: the program code optimizing the query with low performance to generate the optimized version of the query with low performance. To optimize the query, the program code selects a classical optimization method from a group of classical optimization methods. The program code applies the selected classical optimization method to the query with low performance to generate a potential optimized version of the query with low performance. The program code tests the potential optimized version of the query in the small data environment. To test this version, the program code executes the potential optimized version of the query against the small data environment to generate a first results set. The program code executes the query with low performance against the small data environment to generate a second results set. The program code compares the first results set to the second results set to determine if the first results set and the second results set are a common results set.

In some examples, based on determining that the first results set, and the second results are the common results set, the program code tests the potential optimized version of the query in the big data environment. To perform this test, the program code executes the potential optimized version of the query against the big data environment to generate a third results set. The program code executes the query with low performance against the big data environment to generate a fourth results set. The program code compares the third results set to the fourth results set to determine if the third results set and the fourth results set are another common results set.

In some examples, based on determining that the first results set, and the second results are not the common results set, the program code re-optimizes the query with low performance. To re-optimize the query, the program code selects a new classical optimization method from the group of classical optimization methods. The program code applies the selected new classical optimization method to the query with low performance to generate a new potential optimized version of the query with low performance. The program code tests the new potential optimized version of the query in the small data environment. To test this new version, the program code executes the new potential optimized version of the query against the small data environment to generate a new first results set. The program code compares the new first results set to the second results set to determine if the new first results set, and the second results set are a common results set.

In some examples, based on determining that the third results set, and the fourth results are the other common results set, the program code determines if performance of the potential optimized version of the query meets a pre-defined performance threshold. Based on determining that the performance of the potential optimized version of the query meets the pre-defined performance threshold, the program code designates the potential optimized version of the query as an optimized version of the query with low performance.

In some examples, the program code obtains instructions to execute the query with low performance. The program code executes the optimized version of the query with low performance instead of the query with low performance.

In some examples, based on determining that the third results set, and the fourth results are not the other common results set, the program code re-optimizes the query with low performance by selecting another new classical optimization method from the group of classical optimization methods. The program code applies the selected other new classical optimization method to the query with low performance to generate another new potential optimized version of the query with low performance. The program code tests the other new potential optimized version of the query in the small data environment. The test includes the program code executing the other new potential optimized version of the query against the small data environment to generate another new first results set. The program code compares the other new first results set to the second results set to determine if the other new first results set, and the second results set are a common results set.

In some examples, the program code sampling the portion of each table of the one or more tables comprises the program code ordering each table of the one or more tables based on number of references to each table, and the program code sampling each table of the one or more tables based on the order.

In some examples, the program code identifying the query with low performance comprises: the program code analyzing historical log data to identify, based on a pre-determined threshold, the query with low performance.

In some examples, the program code analyzing the historical log comprises the program code utilizing keywords to identify the query with low performance.

In some examples, the program code identifying the query with low performance comprises: the program code utilizing automatic clocking services, to identify, based on a pre-determined threshold, the query with low performance.

Although various embodiments are described above, these are only examples. For example, reference architectures of many disciplines may be considered, as well as other knowledge-based types of code repositories, etc., may be considered. Many variations are possible.

Various aspects and embodiments are described herein. Further, many variations are possible without departing from the spirit of aspects of the present disclosure. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of improving performance of queries with historically low performance in a big data environment, the method comprising:

identifying, by one or more processors, a query with low performance;

generating, by the one or more processors, a small data environment from the big data environment, the small data environment for use in optimizing the query with low performance, the generating comprising:

automatically identifying, by the one or more processors, one or more tables and one or more fields for inclusion in the small data environment, wherein each of the identified one or more tables and each of the one or more fields is referenced in the query with the low performance;

sampling, by the one or more processors, a portion of each table of the identified such that each table in the small data environment comprises common data traits to a whole of each table, the sampling comprising:

for each table of the identified one or more tables:

selecting, by the one or more processors, for inclusion in the small data environment, rows in the table comprising fields with outlier values for each of the identified one or more fields;

selecting, by the one or more processors, for inclusion in the small data environment, rows in the table comprising maximum and minimum values of the identified one or more fields excluding the outlier values; and selecting, by the one or more processors, for inclusion in the small data environment, rows in the table comprising average values for an interval of values of the identified one or more fields in the table:

and generating, by the one or more processors, the small data environment, the small data environment comprising the portion of each table.

2. The computer-implemented method of claim 1, wherein selecting, for inclusion in the small data environment, the rows in the table comprising the average values for the interval of values of the identified one or more fields in the table comprises:

generating, by the one or more processors, an equivalency bin for values of the identified one or more fields; and selecting, by the one or more processors, the rows in the table comprising the average values based on iteratively identifying, by the one or more processors, an average value from the equivalency bin for each value of the values to select a row comprising the average value until the the rows in the table comprising the average values reach a pre-defined sample size.

3. The computer-implemented method of claim 1, the performance testing on the small data environment further comprising:

optimizing, by the one or more processors, the query with low performance to generate the optimized version of the query with low performance;

executing, by the one or more processors, the optimized query in the small data environment; and based on the execution reaching a pre-determined performance threshold, executing, by the one or more processors, the optimized query in the big data environment.

4. The computer-implemented method of claim 1, the performance testing on the small data environment further comprising:

optimizing, by the one or more processors, the query with low performance to generate the optimized version of the query with low performance, the optimizing comprising:

selecting, by the one or more processors, a classical optimization method from a group of classical optimization methods;

applying, by the one or more processors, the selected classical optimization method to the query with low performance to generate a potential optimized version of the query with low performance;

testing, by the one or more processors, the potential optimized version of the query in the small data environment, the testing comprising:

executing, by the one or more processors, the potential optimized version of the query against the small data environment to generate a first results set;

executing, by the one or more processors, the query with low performance against the small data environment to generate a second results set; and comparing, by the one or more processors, the first results set to the second results set to determine if the first results set and the second results set are a common results set.

5. The computer-implemented method of claim 4, further comprising:

based on determining that the first results set, and the second results set are the common results set, testing, by the one or more processors, the potential optimized version of the query in the big data environment, the testing comprising:

executing, by the one or more processors, the potential optimized version of the query against the big data environment to generate a third results set;

executing, by the one or more processors, the query with low performance against the big data environment to generate a fourth results set; and comparing, by the one or more processors, the third results set to the fourth results set to determine if the third results set and the fourth results set are another common results set.

6. The computer-implemented method of claim 4, further comprising:

based on determining that the first results set, and the second results are not the common results set, re-optimizing, by the one or more processors, the query with low performance, the re-optimizing comprising:

selecting, by the one or more processors, a new classical optimization method from the group of classical optimization methods;

applying, by the one or more processors, the selected new classical optimization method to the query with low performance to generate a new potential optimized version of the query with low performance;

testing, by the one or more processors, the new potential optimized version of the query in the small data environment, the testing comprising:

executing, by the one or more processors, the new potential optimized version of the query against the small data environment to generate a new first results set; and comparing, by the one or more processors, the new first results set to the second results set to determine if the new first results set and the second results set are a new common results set.

7. The computer-implemented method of claim 5, further comprising:

based on determining that the third results set, and the fourth results are the other common results set, determining, by the one or more processors, if performance of the potential optimized version of the query meets a pre-defined performance threshold; and based on determining that the performance of the potential optimized version of the query meets the pre-defined performance threshold, designating, by the one or more processors, the potential optimized version of the query as the optimized version of the query with low performance.

8. The computer-implemented method of claim 7, further comprising:

obtaining, by the one or more processors, instructions to execute the query with low performance; and executing, by the one or more processors, the optimized version of the query with low performance instead of the query with low performance.

9. The computer-implemented method of claim 1, further comprising:

obtaining, by the one or more processors, instructions to execute the query with low performance; and executing, by the one or more processors, the optimized version of the query with low performance instead of the query with low performance.

10. The computer-implemented method of claim 5, further comprising:

based on determining that the third results set, and the fourth results are not the other common results set, re-optimizing, by the one or more processors, the query with low performance, the re-optimizing comprising:

selecting, by the one or more processors, another new classical optimization method from the group of classical optimization methods;

applying, by the one or more processors, the selected other new classical optimization method to the query with low performance to generate another new potential optimized version of the query with low performance;

testing, by the one or more processors, the other new potential optimized version of the query in the small data environment, the testing comprising:

executing, by the one or more processors, the other new potential optimized version of the query against the small data environment to generate another new first results set; and comparing, by the one or more processors, the other new first results set to the second results set to determine if the other new first results set and the second results set are a common results set.

11. The computer-implemented method of claim 2, wherein sampling the portion of each table of the identified one or more tables comprises:

ordering, by the one or more processors, each table of the one or more tables based on number of references to each table; and sampling, by the one or more processors, each table of the one or more tables based on the ordering.

12. The computer-implemented method of claim 1, wherein identifying the query with low performance comprises:

analyzing, by the one or more processors, historical log data, to identify, based on a pre-determined threshold, the query with low performance.

13. The computer-implemented method of claim 12, wherein analyzing the historical log data comprises:

analyzing, by the one or more processors, the historical log data utilizing keywords to identify the query with low performance.

14. The computer-implemented method of claim 1, wherein identifying the query with low performance comprises:

utilizing, by the one or more processors, automatic clocking services, to identify, based on a pre-determined threshold, the query with low performance.

15. A computer system for improving performance of queries with historically low performance in a big data environment, the computer system comprising:

a memory; and one or more processors in communication with the memory, wherein the computer system is configured to perform a method, said method comprising:

identifying, by the one or more processors, a query with low performance;

generating, by the one or more processors, a small data environment from the big data environment, the small data environment for use in optimizing the query with low performance, the generating comprising:

automatically identifying, by the one or more processors, one or more tables and one or more fields for inclusion in the small data environment, wherein each of the identified one or more tables and each of the one or more fields is referenced in the query with the low performance;

sampling, by the one or more processors, a portion of each table of the identified such that each table in the small data environment comprises common data traits to a whole of each table, the sampling comprising:

for each table of the identified one or more tables;

selecting, by the one or more processors, for inclusion in the small data environment, rows in the table comprising fields with outlier values for each of the identified one or more fields;

selecting, by the one or more processors, for inclusion in the small data environment, rows in the table comprising maximum and minimum values of the identified one or more fields excluding the outlier values; and selecting, by the one or more processors, for inclusion in the small data environment, rows in the table comprising average values for an interval of values of the identified one or more fields in the table;

and generating, by the one or more processors, the small data environment, the small data environment comprising the portion of each table.

16. The computer system of claim 15, wherein selecting, for inclusion in the small data environment, the rows in the table comprising the average values for the interval of values of the identified one or more fields in the table comprises:

generating, by the one or more processors, an equivalency bin for values of the identified one or more fields; and selecting, by the one or more processors, the rows in the table comprising the average values based on iteratively identifying, by the one or more processors, an average value from the equivalency bin for each value of the values to select a row comprising the average value until the rows in the table comprising the average values reach a pre-defined sample size.

17. The computer system of claim 15, the performance testing on the small data environment further comprising:

optimizing, by the one or more processors, the query with low performance to generate the optimized version of the query with low performance;

executing, by the one or more processors, the optimized query in the small data environment; and based on the execution reaching a pre-determined performance threshold, executing, by the one or more processors, the optimized query in the big data environment.

18. The computer system of claim 15, the performance testing on the small data environment further comprising:

optimizing, by the one or more processors, the query with low performance to generate the optimized version of the query with low performance, the performance testing on the small data environment further comprising:

optimizing, by the one or more processors, the query with low performance to generate the optimized version of the query with low performance;

selecting, by the one or more processors, a classical optimization method from a group of classical optimization methods;

applying, by the one or more processors, the selected classical optimization method to the query with low performance to generate a potential optimized version of the query with low performance;

testing, by the one or more processors, the potential optimized version of the query in the small data environment, the testing comprising:

executing, by the one or more processors, the potential optimized version of the query against the small data environment to generate a first results set;

executing, by the one or more processors, the query with low performance against the small data environment to generate a second results set; and comparing, by the one or more processors, the first results set to the second results set to determine if the first results set and the second results set are a common results set.

19. The computer system of claim 18, the method further comprising:

based on determining that the first results set, and the second results set are the common results set, testing, by the one or more processors, the potential optimized version of the query in the big data environment, the testing comprising:

executing, by the one or more processors, the potential optimized version of the query against the big data environment to generate a third results set;

executing, by the one or more processors, the query with low performance against the big data environment to generate a fourth results set; and comparing, by the one or more processors, the third results set to the fourth results set to determine if the third results set and the fourth results set are another common results set.

20. A computer program product for improving performance of queries with historically low performance in a big data environment, the computer program product comprising:

one or more computer readable storage media and program instructions collectively stored on the one or more computer readable storage media readable by at least one processing circuit to:

identify a query with low performance;

generate a small data environment from the big data environment, the small data environment for use in optimizing the query with low performance, the generating comprising:

automatically identify one or more tables and one or more fields for inclusion in the small data environment, wherein each of the identified one or more tables and each of the one or more fields is referenced in the query with the low performance;

sample a portion of each table of the identified one or more tables such that each table in the small data environment comprises common data traits to a whole of each table, the sampling comprising:

for each table for each table of the identified one or more tables:

select, for inclusion in the small data environment, rows in the table comprising fields with outlier values for each of the identified one or more fields;

select, for inclusion in the small data environment, rows in the table comprising maximum and minimum values of the identified one or more fields excluding the outlier values; and select, for inclusion in the small data environment, rows in the table comprising average values for an interval of values of the identified one or more fields in the table;

generate the small data environment, the small data environment comprising the portion of each table; and performance test an optimized version of the query with low performance, by executing the optimized version on the small data environment.

* * * * *